No. 836,796. PATENTED NOV. 27, 1906.
W. S. ANDERSON.
EYEGLASS RETAINER.
APPLICATION FILED JUNE 26, 1906.
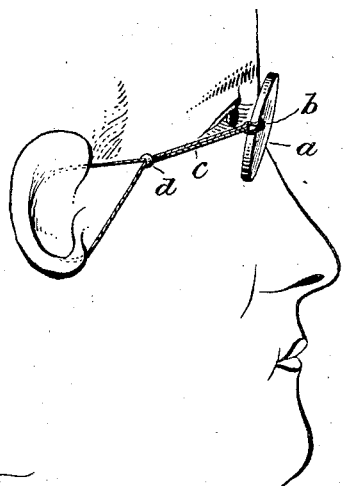
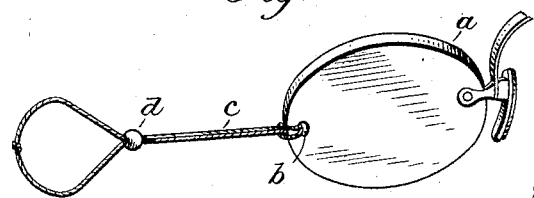
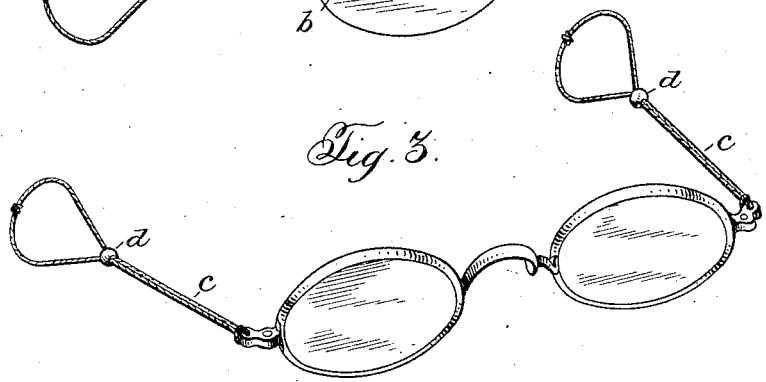
Witnesses:
Jas. E. Hutchinson
E. G. Roderick
Inventor:
Walter S. Anderson
By Hall Heylman Attorneys

UNITED STATES PATENT OFFICE.

WALTER S. ANDERSON, OF THE UNITED STATES NAVY.

EYEGLASS-RETAINER.

No. 836,796.　　　Specification of Letters Patent.　　　Patented Nov. 27, 1906.

Application filed June 26, 1906. Serial No. 323,421.

*To all whom it may concern:*

Be it known that I, WALTER S. ANDERSON, ensign in the United States Navy, a citizen of the United States, whose present address is Washington, District of Columbia, have invented certain new and useful Improvements in Eyeglass-Retainers, of which the following is a specification.

My invention relates to eyeglasses, and more particularly to retainers or holders associated with the eyeglasses.

The invention is particularly applicable to eyeglasses which are provided with nose-grips or eyeglasses of the pince-nez type; and its object is to provide an extremely simple and inexpensive retainer which will act to steady the glasses when worn, or hold the same more rigidly than when supported by the nose-grips alone, and to support the eyeglasses when detached from the nose.

To this end the invention comprises the combination and arrangement of parts to be hereinafter described, and particularly pointed out in the claims.

The invention is illustrated in the accompanying drawings, in which—

Figure 1 shows a pair of eyeglasses equipped with my retainer. Fig. 2 is a detail view, and Fig. 3 is a perspective view of a modification. Fig. 4 is a detail view.

In the accompanying drawings a pair of pince-nez eyeglasses is designated $a$, the right-hand lens of which has a hole $b$ extending therethrough near the outer edge of the same, as is quite customary for receiving an ordinary flexible holder.

My retainer is designated $c$ and consists of a strand of very flexible material, preferably silk cord, which is doubled upon itself to provide a loop, one end of which is secured to the outer edge of one of the lenses of the eyeglasses in any desired manner, preferably by passing a bight of the loop through the hole $b$ when the lens is provided with such opening and passing the remainder of the loop through the projecting end of the bight; but it will be understood that the end of the loop may be secured to the lens in any other manner. The retainer $c$ is approximately of a length equal to or somewhat greater than that between the outer edge of the lens when the glasses are in position upon the nose of the wearer and the rear part of the base of the adjacent outer ear, so that when one end of the retainer is secured to the lens, as stated, the other end of the loop may be passed over the pinna of the ear.

My invention contemplates means for varying the effective length of the retainer as well as for reducing or confining the part of the loop which encircles the ear, in order that the retainer may be drawn somewhat taut for steadying the eyeglasses and in order that accidental detachment of the loop from the ear may be prevented. To subserve these purposes, a small slide, designated $d$, is arranged on the retainer. This slide may be in the form of a bead or button; but whatever its form it is desirable that the edges thereof be rounded, so as to prevent irritation of the portion of the face of the wearer against which it may rest, and the bead is further provided with a bore for the reception of the retainer, so proportioned to the latter that it will slightly compress the same, so that the slide will remain in any adjusted position by frictional engagement. To prevent the slide slipping off the free end of the retainer, the latter is preferably formed with an enlargement in its length of greater diameter than the bore of the slide. This enlargement may be provided by forming a knot in the strand.

It will be appreciated that the effective length of the retainer is increased by slipping the slide toward the lens and decreased by slipping the slide toward the ear. By this means the retainer may be adjusted so that it may be worn by different persons and so that it will always act to steady the eyeglasses.

In Fig. 3 an embodiment of my invention is illustrated in which the retainer is associated with each lens in place of the ordinary temple members. As it is well known, the metallic temple members associated with ordinary eyeglasses are very annoying and irritating to some persons; but my retainers, being made of a soft silk cord, are not open to the same objections, while they will act as effectively in holding the eyeglasses in place and will also occupy less room in a case or the like in which the eyeglasses may be placed when not in use.

The invention will be fully understood from the foregoing description, taken in connection with the accompanying drawings, and it will be appreciated that changes may be made from the particular exemplification of the invention disclosed without departing from the spirit and scope of the invention.

I claim—

1. The combination with a pair of eyeglasses, of a retainer associated therewith, comprising a flexible strand doubled to form a loop, said loop having one end secured to one edge of one of the lenses of the eyeglasses and being of a length approximately equal to the distance between said lens and the adjacent ear of the wearer of the eyeglasses, substantially as described.

2. The combination with a pair of eyeglasses, of a retainer associated therewith, comprising a flexible strand doubled to form a loop, said loop having one end secured to one edge of one of the lenses of the eyeglasses and being of a length approximately equal to the distance between said lens and the adjacent ear of the wearer of the eyeglasses, and means for contracting the rear end of the loop about the ear and for varying the effective length of the retainer, substantially as described.

3. The combination with a pair of eyeglasses, of a retainer associated therewith, comprising a flexible strand doubled to form a loop, said loop having one end secured to one edge of one of the lenses of the eyeglasses and being of a length approximately equal to the distance between said lens and the adjacent ear of the wearer of the eyeglasses, and a slide for contracting the rear end of the loop about the ear and for varying the effective length of the retainer, substantially as described.

4. A pair of eyeglasses having temple members formed of flexible strands doubled to provide loops, said loops being secured to the outer edges of the lenses and being each of a length approximately equal to the distance between the edge of the lens to which it is secured and the adjacent ear of the wearer of the eyeglasses, substantially as described.

In testimony whereof I have hereunto signed my name, in the presence of two witnesses, at Washington, District of Columbia, this 15th day of June, 1906.

WALTER S. ANDERSON.

Witnesses:
HENRY E. COOPER,
E. G. RODERICK.